(12) United States Patent
Hata et al.

(10) Patent No.: US 10,518,766 B2
(45) Date of Patent: Dec. 31, 2019

(54) CONTROL SYSTEM FOR HYBRID VEHICLE, HYBRID VEHICLE, AND CONTROL METHOD FOR HYBRID VEHICLE

(71) Applicant: TOYOTA JIDOSHA KABUSHIKI KAISHA, Toyota-shi (JP)

(72) Inventors: Kensei Hata, Sunto-gun (JP); Akira Murakami, Gotemba (JP); Hidekazu Nagai, Susono (JP); Takahito Endo, Sunto-gun (JP); Yuji Iwase, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 153 days.

(21) Appl. No.: 15/432,468

(22) Filed: Feb. 14, 2017

(65) Prior Publication Data
US 2017/0232958 A1    Aug. 17, 2017

(30) Foreign Application Priority Data

Feb. 15, 2016    (JP) .................................. 2016-026166

(51) Int. Cl.
*B60W 10/06*    (2006.01)
*B60W 10/08*    (2006.01)
(Continued)

(52) U.S. Cl.
CPC ............. *B60W 20/40* (2013.01); *B60K 6/445* (2013.01); *B60K 6/52* (2013.01); *B60W 10/06* (2013.01); *B60W 10/08* (2013.01); *B60W 20/00* (2013.01); *B60W 20/15* (2016.01); *B60W 30/045* (2013.01); *B60W 30/188* (2013.01);

(Continued)

(58) Field of Classification Search
CPC .......... B60K 6/365; B60K 6/445; B60K 6/52; B60W 10/06; B60W 10/08; B60W 20/00; B60W 20/15; B60W 20/40; B60W 30/045; B60W 30/18145; B60W 30/188; B60W 2510/083; B60W 2520/125; B60W 2520/14; B60W 2520/403; B60W 2540/18; B60W 2710/083; B60W 2710/085; B60W 2720/403; Y02T 10/6239; Y02T 10/6265;
(Continued)

(56) References Cited

U.S. PATENT DOCUMENTS 9,260,110 B2 *    2/2016    Tamura .................. B60W 10/04
2005/0169765 A1    8/2005    Ito et al.
(Continued)

FOREIGN PATENT DOCUMENTS

CN    102381177 A    3/2012
CN    103523004 A    1/2014
(Continued)

*Primary Examiner* — Jerrah Edwards
(74) *Attorney, Agent, or Firm* — Oblon, McClelland, Maier & Neustadt, L.L.P.

(57) ABSTRACT

When an engine is started by causing a first motor coupled to first drive wheels to motor the engine while a hybrid vehicle is turning with the engine stopped, an electronic control unit controls output torque of a second motor, in such a direction as to curb change of a steering characteristic of the hybrid vehicle due to change of drive torque of the first drive wheels induced by motoring of the engine by the first motor.

14 Claims, 7 Drawing Sheets

(51) Int. Cl.
*B60W 20/40* (2016.01)
*B60W 30/18* (2012.01)
*B60W 30/188* (2012.01)
*B60W 20/15* (2016.01)
*B60K 6/445* (2007.10)
*B60K 6/52* (2007.10)
*B60W 20/00* (2016.01)
*B60W 30/045* (2012.01)
*B60K 6/365* (2007.10)

(52) U.S. Cl.
CPC ....... *B60W 30/18145* (2013.01); *B60K 6/365* (2013.01); *B60W 2510/083* (2013.01); *B60W 2520/125* (2013.01); *B60W 2520/14* (2013.01); *B60W 2520/403* (2013.01); *B60W 2540/18* (2013.01); *B60W 2710/083* (2013.01); *B60W 2710/085* (2013.01); *B60W 2720/403* (2013.01); *Y02T 10/6239* (2013.01); *Y02T 10/6265* (2013.01); *Y02T 10/6286* (2013.01); *Y02T 10/7258* (2013.01); *Y10S 903/906* (2013.01); *Y10S 903/911* (2013.01); *Y10S 903/93* (2013.01)

(58) Field of Classification Search
CPC ............. Y02T 10/6286; Y02T 10/7258; Y10S 903/906; Y10S 903/911; Y10S 903/93
See application file for complete search history.

(56) References Cited

U.S. PATENT DOCUMENTS

| | | |
|---|---|---|
| 2010/0071975 A1 | 3/2010 | Aoki |
| 2013/0054064 A1* | 2/2013 | Tamura ................ B60W 10/04 |
| | | 701/22 |
| 2014/0012441 A1 | 1/2014 | Wang et al. |
| 2015/0239466 A1 | 8/2015 | Harada et al. |

FOREIGN PATENT DOCUMENTS

| | | |
|---|---|---|
| DE | 10 2005 001 715 A1 | 8/2005 |
| JP | 2005-253175 A | 9/2005 |
| JP | 2010-215038 A | 9/2010 |
| JP | 2010215038 A * | 9/2010 |
| KR | 10-2015-0100514 | 9/2015 |

* cited by examiner

| SUN GEAR S | CARRIER C | RING GEAR R |
|---|---|---|
| REACTION FORCE | INPUT | OUTPUT |
| OUTPUT | INPUT | REACTION FORCE |
| REACTION FORCE | OUTPUT | INPUT |
| OUTPUT | REACTION FORCE | INPUT |
| INPUT | REACTION FORCE | OUTPUT |
| INPUT | OUTPUT | REACTION FORCE |

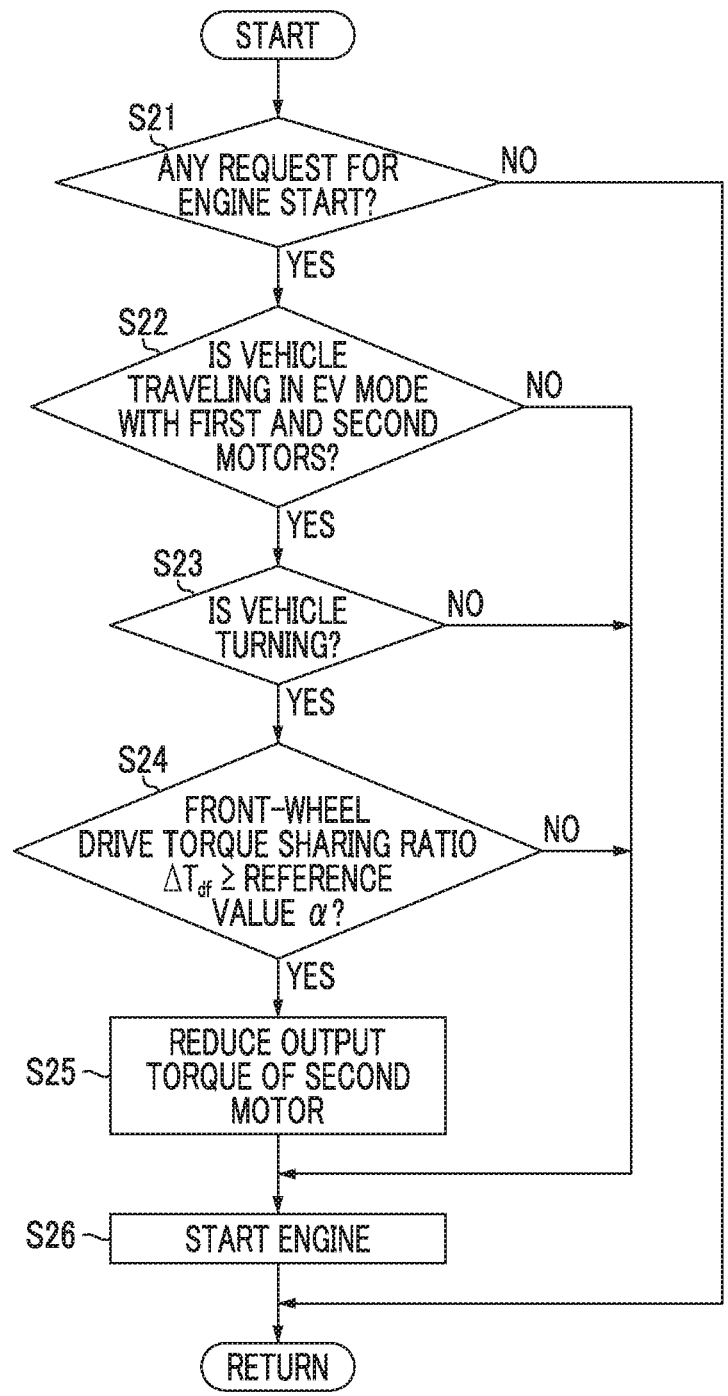

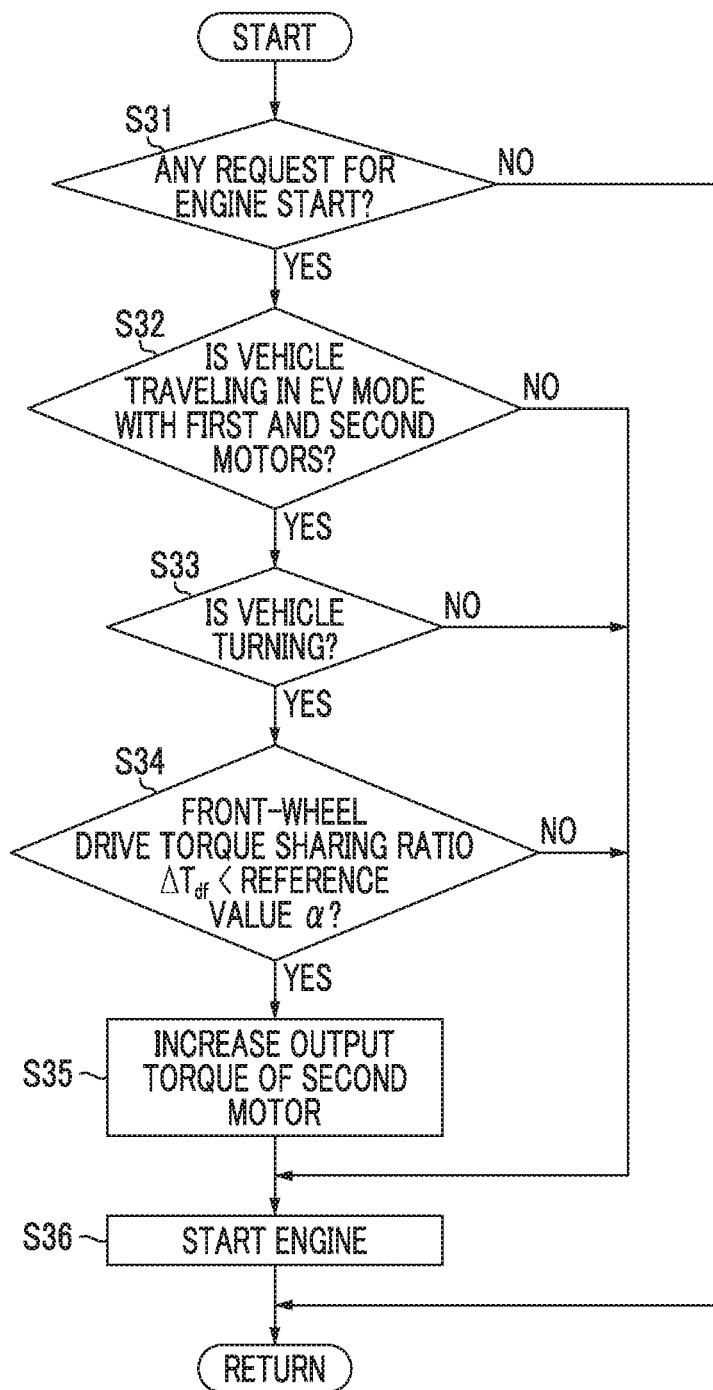

CONTROL SYSTEM FOR HYBRID VEHICLE, HYBRID VEHICLE, AND CONTROL METHOD FOR HYBRID VEHICLE

INCORPORATION BY REFERENCE

The disclosure of Japanese Patent Application No. 2016-026166 filed on Feb. 15, 2016 including the specification, drawings and abstract is incorporated herein by reference in its entirety.

BACKGROUND

1. Technical Field

The disclosure relates to a control system that controls drive torque of a hybrid vehicle including an engine and electric motors, and also relates to a control method, and a hybrid vehicle.

2. Description of Related Art

One example of a hybrid vehicle including an engine and motor-generators as driving force sources is described in Japanese Patent Application Publication No. 2010-215038 (JP 2010-215038 A). In the example of the hybrid vehicle described in JP 2010-215038 A, the engine and a first motor-generator are coupled to a differential mechanism that performs differential operation with three rotational elements, and an output element of the differential mechanism is coupled to an input element of a front-and-rear-wheel driving force distribution mechanism in the form of a planetary gear mechanism, for example. The front-and-rear-wheel driving force distribution mechanism has two rotational elements that provide output elements, other than the input element, and is arranged to deliver driving force from one of the output elements to the front wheels, and deliver driving force from the other output element to the rear wheels. A second motor-generator is coupled to the output element that delivers driving force to the rear wheels. Then, a clutch is provided for coupling these two output elements or disconnecting the output elements from each other.

When the engine is started from a condition where the vehicle is traveling with the engine stopped, the engine is motored by the first motor-generator. In this case, reaction-force torque is applied to the output element of the differential mechanism. Thus, in the system described in JP 2010-215038 A, the clutch is engaged so as to couple the two rotational elements of the front-and-rear-wheel driving force distribution mechanism, and integrate all components of the front-and-rear-wheel driving force distribution mechanism. When the clutch is engaged, the front wheels and the rear wheels cannot rotate at differential speeds. Therefore, in the system described in JP 2010-215038 A, the engine is inhibited from being started during turning.

SUMMARY

The hybrid vehicle, which includes the motors or motor-generators (which will be collectively denoted as "motors") as well as the engine, is able to travel with drive torque of the motor(s) alone. However, if the required drive torque increases, or the remaining amount of charge of a power storage device is reduced, in a condition where the vehicle is traveling with power from the motor(s), the engine is started, so as to increase the drive torque, or increase the amount of electric power generated by any one of the motors. In the system described in JP 2010-215038 A, if the hybrid vehicle is turning when the engine needs to be started, starting of the engine is stopped or inhibited; therefore, the driver may feel strange or uncomfortable since the request for increase of the drive torque cannot be satisfied, or the power storage device may be excessively discharged, for example.

This disclosure provides a control system for a hybrid vehicle, a hybrid vehicle, and a control method for a hybrid vehicle, which can prevent or curb change of a steering characteristic or reduction of traveling stability, which is induced by starting of an engine by use of a motor that functions as a driving force source.

A first aspect of the disclosure is concerned with a control system for a hybrid vehicle. The hybrid vehicle includes an engine and a first motor, a second motor, a differential mechanism, and an electronic control unit. The engine and the first motor are configured to deliver drive torque to first drive wheels as one pair of front wheels and rear wheels. The second motor is configured to deliver drive torque to second drive wheels as the other pair of the front wheels and the rear wheels. The differential mechanism includes a first rotational element configured to receive torque of the engine, a second rotational element configured to receive torque of the first motor, and a third rotational element configured to deliver torque to the first drive wheels. The electronic control unit is configured to perform motoring of the engine by the first motor. Also, the electronic control unit is configured to control output torque of the second motor motoring of the engine by the first motor is performed while the hybrid vehicle is turning with the engine stopped, in such a direction as to curb change of a steering characteristic of the hybrid vehicle due to change of drive torque of the first drive wheels induced by starting of the engine by the first motor.

With the control system configured as described above, the front wheels and the rear wheels are drive wheels, and a first drive system that delivers drive torque to the first drive wheels is configured to deliver torque from the differential mechanism to which the engine and the first motor are coupled, to the first drive wheels. Accordingly, as the engine is motored by the first motor, reaction-force torque that reduces torque in the forward traveling direction is applied to the first drive wheels. Also, drive torque is transmitted to the second drive wheels, via a second drive system having the second motor. When the engine is started while the vehicle is turning with operation of the engine stopped, the drive torque of the first drive wheels changes due to reaction force induced by starting of the engine by the first motor, and the lateral force of the first drive wheels also changes with change of the drive torque. In this case, the electronic control unit controls the output torque of the second motor, in the direction to curb change of the steering characteristic due to change of the lateral force of the first drive wheels. Accordingly, the steering characteristic does not change, or does not largely change, after starting of the engine, as compared with that before starting of the engine. Therefore, the steering characteristic during turning involving starting of the engine is not largely different from the steering characteristic during turning without involving starting of the engine. Thus, the engine can be started even while the vehicle is turning, and it is possible to improve the traveling stability during turning, or prevent or curb reduction of the traveling stability.

In the control system as described above, the first drive wheels may be the front wheels, and the second drive wheels may be the rear wheels. The electronic control unit may be configured to increase the output torque of the second motor when motoring of the engine by the first motor is performed and the hybrid vehicle turns while traveling with the output torque of the second motor.

With the control system thus configured, if the engine is motored by the first motor while the vehicle is turning with the front wheels steered, reaction-force torque is applied to the front wheels. Then, when the reaction-force torque turns into braking torque of the front wheels, and the lateral force of the front wheels is reduced, the drive torque of the rear wheels is increased by the second motor, so that the lateral force of the rear wheels is reduced. Therefore, change of the steering characteristic to the understeer side due to reduction of the lateral force of the front wheels can be diminished or corrected by change of the steering characteristic to the oversteer side due to reduction of the lateral force of the rear wheels.

In the control system as described above, the first drive wheels may be the rear wheels, and the second drive wheels may be the front wheels. The electronic control unit may be configured to increase the output torque of the second motor when motoring of the engine by the first motor is performed, in one of a condition where the hybrid vehicle turns while traveling with output torque of the first motor, and a condition where the hybrid vehicle turns while traveling with the output torque of the first motor and the output torque of the second motor.

With the control system thus configured, when the drive torque and lateral force of the rear wheels are reduced due to starting of the engine by the first motor, during turning of the vehicle with the front wheels steered, the drive torque of the front wheels is increased by the second motor, so that the lateral force of the front wheels is reduced. Therefore, change of the steering characteristic to the oversteer side due to reduction of the lateral force of the rear wheels can be diminished or corrected by change of the steering characteristic to the understeer side due to reduction of the lateral force of the front wheels.

In the control system as described above, the first drive wheels may be the front wheels, and the second drive wheels may be the rear wheels. The electronic control unit may be configured to determine whether a drive torque sharing ratio of the front wheels is equal to or larger than a predetermined reference value. Then, the electronic control unit may reduce the output torque of the second motor, when the drive torque sharing ratio of the front wheels is equal to or larger than the reference value, and motoring of the engine by the first motor is performed. The drive torque sharing ratio of the front wheels is a ratio of drive torque of the front wheels to overall drive torque of the hybrid vehicle in the case where the hybrid vehicle turns while traveling with the output torque of the first motor and the output torque of the second motor.

With the control system thus configured, in a condition where operation of the engine is stopped, the vehicle can travel with the front wheels and the rear wheels driven by the first motor and the second motor. If the engine is motored by the first motor when the vehicle turns with the front wheels and the rear wheels thus driven and the front wheels steered, the drive torque of the front wheels is reduced. In this case, if the front-wheel drive torque sharing ratio is equal to or larger than the predetermined value, the lateral force increases due to reduction of the drive torque, and the steering characteristic changes to the oversteer side. In this situation, the electronic control unit reduces the output torque of the second motor, so as to increase the lateral force of the rear wheels. As a result, the steering characteristic changes to the understeer side. Thus, since change of the steering characteristic at the front wheels is opposite to change of the steering characteristic at the rear wheels, the steering characteristic is prevented from changing, or is less likely or unlikely to change.

In the control system as described above, the first drive wheels may be the front wheels, and the second drive wheels may be the rear wheels. The electronic control unit may be configured to determine whether a drive torque sharing ratio of the front wheels is smaller than a predetermined reference value. Then, the electronic control unit may increase the output torque of the second motor, when the drive torque sharing ratio of the front wheels is smaller than the reference value, and motoring of the engine by the first motor is performed. The drive torque sharing ratio of the front wheels is a ratio of drive torque of the front wheels to overall drive torque of the hybrid vehicle when the hybrid vehicle turns while traveling with the output torque of the first motor and the output torque of the second motor.

With the control system thus configured, in a condition where operation of the engine is stopped, the vehicle can travel with the front wheels and the rear wheels driven by the first motor and the second motor. If the engine is motored by the first motor when the vehicle turns with the front wheels and the rear wheels thus driven and the front wheels steered, the drive torque of the front wheels is reduced. In this case, if the front-wheel drive torque sharing ratio is smaller than the predetermined value, the lateral force is reduced due to reduction of the drive torque, and the steering characteristic changes to the understeer side. In this situation, the electronic control unit increases the output torque of the second motor, so as to reduce the lateral force of the rear wheels. As a result, the steering characteristic changes to the oversteer side. Thus, since change of the steering characteristic at the front wheels is opposite to change of the steering characteristic at the rear wheels, the steering characteristic is prevented from changing, or is less likely or unlikely to change.

In the control system as described above, the electronic control unit may be configured to change the output torque of the second motor at a predetermined rate of change.

With the control system thus configured, when the electronic control unit changes the output torque of the second motor so as to curb change of the steering characteristic, the output torque of the second motor is gradually changed at the predetermined rate of change; therefore, the steering characteristic can be further stabilized.

In the control system as described above, the electronic control unit may be configured to further control output torque of the first motor and the output torque of the second motor, such that total torque as a sum of torque at the first drive wheels and torque at the second drive wheels after the output torque of the second motor is controlled in the direction to curb change of the steering characteristic is applied in such a direction as to accelerate the hybrid vehicle.

With the control system thus configured, the drive torque of the first drive wheels is reduced when the engine is started, and the drive torque of the second drive wheels is changed so as to curb change of the steering characteristic. Then, the electronic control unit controls the output torque of the first motor and that of the second motor, so that the total torque as the sum of the torque at the first drive wheels and the torque at the second drive wheels is applied in the direction to accelerate the hybrid vehicle. Thus, since drive torque of the hybrid vehicle as a whole, after the drive torque or the output torque of each motor is controlled, is applied in the direction to accelerate the hybrid vehicle, shock is suppressed even if the drive torque increases when start-up of the engine is completed.

A second aspect of the disclosure is concerned with a hybrid vehicle. The hybrid vehicle includes an engine and a first motor, a second motor, a differential mechanism, and an electronic control unit. The engine and the first motor are configured to deliver drive torque to first drive wheels as one pair of front wheels and rear wheels. The second motor is configured to deliver drive torque to second drive wheels as the other pair of the front wheels and the rear wheels. The differential mechanism includes a first rotational element configured to receive torque of the engine, a second rotational element configured to receive torque of the first motor, and a third rotational element configured to deliver torque to the first drive wheels. The electronic control unit is configured to perform motoring of the engine by the first motor. Also, the electronic control unit is configured to control output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor.

With the hybrid vehicle configured as described above, the front wheels and the rear wheels are drive wheels, and a first drive system that delivers drive torque to the first drive wheels is configured to deliver torque from the differential mechanism to which the engine and the first motor are coupled, to the first drive wheels. Accordingly, as the engine is motored by the first motor, reaction-force torque that reduces torque in the forward traveling direction is applied to the first drive wheels. Also, drive torque is transmitted to the second drive wheels, via a second drive system having the second motor. When the engine is started while the vehicle is turning with operation of the engine stopped, the drive torque of the first drive wheels changes due to reaction force induced by starting of the engine by the first motor, and the lateral force of the first drive wheels also changes with change of the drive torque. In this case, the electronic control unit controls the output torque of the second motor, in the direction to curb change of the steering characteristic due to change of the lateral force of the first drive wheels. Accordingly, the steering characteristic does not change, or does not largely change, after starting of the engine, as compared with that before starting of the engine. Therefore, the steering characteristic during turning involving starting of the engine is not largely different from the steering characteristic during turning without involving starting of the engine. Thus, the engine can be started even while the vehicle is turning, and it is possible to improve the traveling stability during turning, or prevent or curb reduction of the traveling stability.

A third aspect of the disclosure is concerned with a control method for a hybrid vehicle. The hybrid vehicle includes an engine and a first motor, a second motor, a differential mechanism, and an electronic control unit. The engine and the first motor are configured to deliver drive torque to first drive wheels as one pair of front wheels and rear wheels. The second motor is configured to deliver drive torque to second drive wheels as the other pair of the front wheels and the rear wheels. The differential mechanism includes a first rotational element configured to receive torque of the engine, a second rotational element configured to receive torque of the first motor, and a third rotational element configured to deliver torque to the first drive wheels. The electronic control unit is configured to perform motoring of the engine by the first motor. The control method includes controlling output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor.

With the above arrangement, the front wheels and the rear wheels are drive wheels, and a first drive system that delivers drive torque to the first drive wheels is configured to deliver torque from the differential mechanism to which the engine and the first motor are coupled, to the first drive wheels. Accordingly, as the engine is motored by the first motor, reaction-force torque that reduces torque in the forward traveling direction is applied to the first drive wheels. Also, drive torque is transmitted to the second drive wheels, via a second drive system having the second motor. When the engine is started while the vehicle is turning with operation of the engine stopped, the drive torque of the first drive wheels changes due to reaction force induced by starting of the engine by the first motor, and the lateral force of the first drive wheels also changes with change of the drive torque. In this case, the electronic control unit controls the output torque of the second motor, in the direction to curb change of the steering characteristic due to change of the lateral force of the first drive wheels. Accordingly, the steering characteristic does not change, or does not largely change, after starting of the engine, as compared with that before starting of the engine. Therefore, the steering characteristic during turning involving starting of the engine is not largely different from the steering characteristic during turning without involving starting of the engine. Thus, the engine can be started even while the vehicle is turning, and it is possible to improve the traveling stability during turning, or prevent or curb reduction of the traveling stability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a flowchart useful for explaining a fourth control example carried out in the embodiment of the disclosure; and FIG. 10 is a flowchart useful for explaining a fifth control example carried out in the embodiment of the disclosure.

DETAILED DESCRIPTION OF EMBODIMENTS

Figure 1:
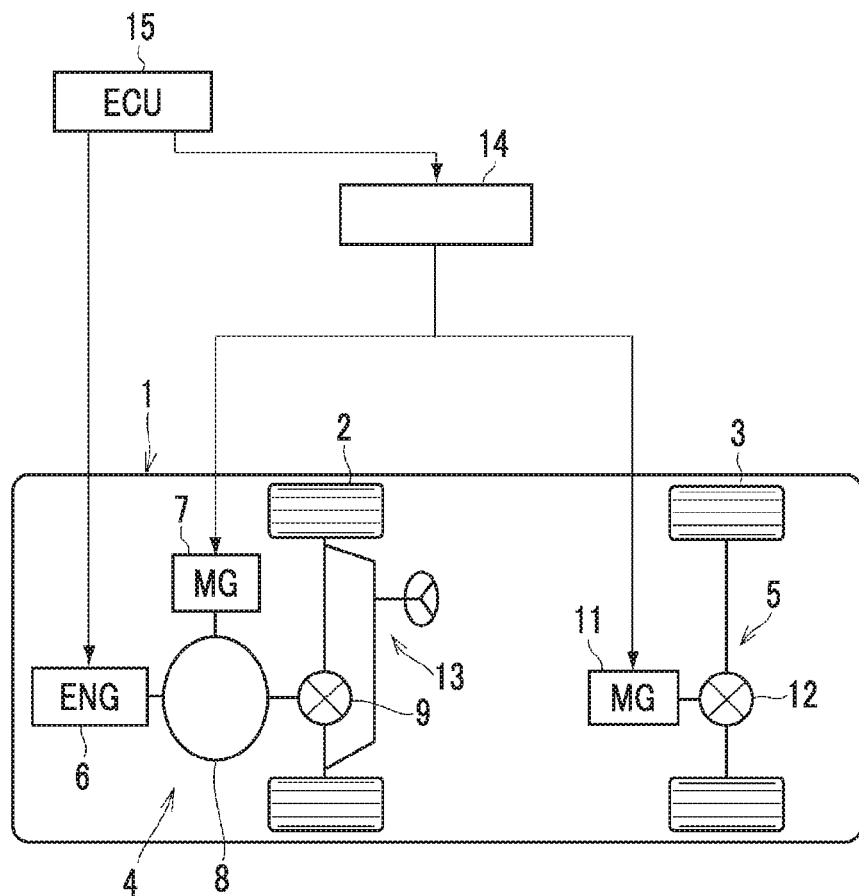
FIG. 1 is a schematic view of a drive system and a control system of a hybrid vehicle according to one embodiment of the disclosure.

One embodiment of this disclosure will be described with reference to the drawings. A hybrid vehicle 1 to which this disclosure can be applied includes a first drive system 4 that drives one pair of front wheels 2 and rear wheels 3, and a second drive system 5 that drives the other pair of the front wheels 2 and the rear wheels 3. In the embodiment described below, the front wheels 2 are regarded as first drive wheels, and the first drive system 4 is a drive system that delivers drive torque to the front wheels 2, while the rear wheels 3 are regarded as second drive wheels, and the second drive system 5 is a drive system that delivers drive torque to the rear wheels 3. One example of the hybrid vehicle 1 is schematically illustrated in FIG. 1. As shown in FIG. 1, the first drive system 4 has an engine (ENG) 6, a first motor 7, and a differential mechanism 8 to which the engine 6 and the first motor 7 are coupled, and is configured to deliver drive torque from the differential mechanism 8 to the front wheels 2 via a differential gear unit 12.

The engine 6 is an engine, such as a gasoline engine or a diesel engine, which generates torque by burning fuel. When the engine 6 is started, its output shaft (not shown), such as a crankshaft, needs to be motored. The first motor 7 may be a general motor, such as a synchronous electric motor, which is supplied with electric power and produces torque, or may be a motor-generator (MG) having a function of generating electric power.

Figure 2:
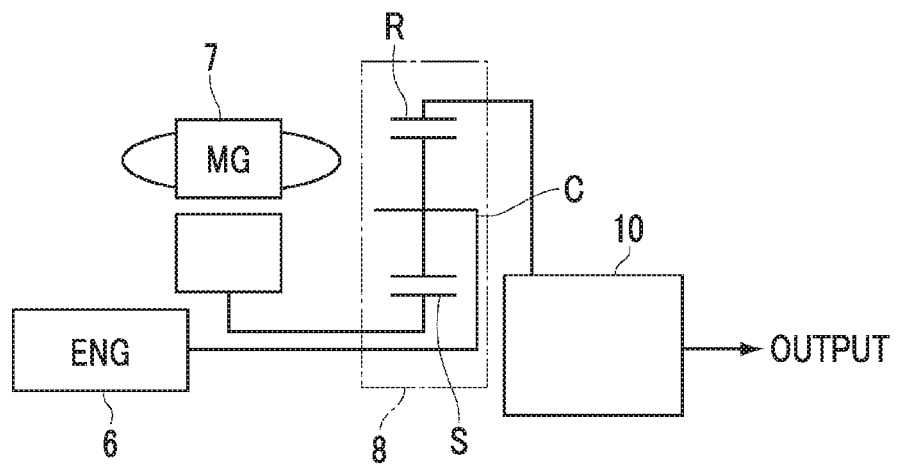
FIG. 2 is a schematic view illustrating the skeleton of a differential mechanism in the form of a single pinion planetary gear mechanism.

The differential mechanism 8 has at least three rotational elements, i.e., an input element to which torque is transmitted from the engine 6, a reaction-force element to which torque is transmitted from the first motor 7, and an output element that delivers torque to the front wheels 2, and performs differential operation with these rotational elements. Accordingly, the differential mechanism 8 may be in the form of a planetary gear mechanism of a single pinion type or a double pinion type, for example. FIG. 2 shows one example of the differential mechanism 8 in the form of a single pinion planetary gear mechanism, which has a sun gear S, a ring gear R, and a carrier C as its rotational elements. The ring gear R is disposed concentrically with the sun gear S, and the carrier C holds pinion gears P that mesh with the sun gear S and the ring gear R. In the example shown in FIG. 2, the carrier C to which the engine 6 is coupled serves as the input element, and the sun gear S to which the first motor 7 is coupled serves as the reaction-force element, while the ring gear R serves as the output element that delivers torque to the front wheels 2.

With the above arrangement, when the engine 6 delivers torque, the first motor 7 generates reaction-force torque, so that the ring gear R rotates in the same direction as the engine 6, and delivers drive torque to the front wheels 2. Also, when the first motor 7 delivers torque in a positive direction (direction of torque delivered by the engine 6) in a condition where operation of the engine 6 is stopped, the ring gear R receives reaction-force torque. Namely, torque is applied to the ring gear R in a negative direction (direction opposite to the direction of torque delivered by the engine 6), and the carrier C and the engine 6 coupled to the carrier C rotate in the positive direction. Accordingly, the engine 6 can be motored by means of the first motor 7.

Figures 3, 4:
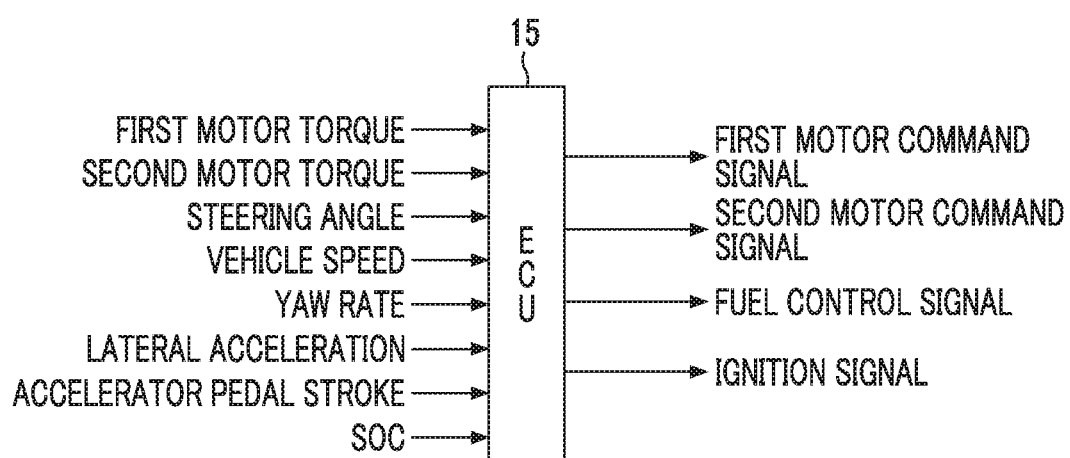
FIG. 3 is a table showing an example of combinations between a sun gear, a carrier, and a ring gear of the single pinion planetary gear mechanism, and an input element, a reaction-force element, and an output element.
FIG. 4 is a block diagram showing an example of data received by an ECU and control command signals generated from the ECU.

In this embodiment of the disclosure in which the differential mechanism 8 is in the form of the planetary gear mechanism, any of the rotational elements may provide the input element, or the reaction-force element, or the output element. The table of FIG. 3 shows an example of combinations between the sun gear S, carrier C, and the ring gear R, and the input element, reaction-force element, and the output element. In FIG. 3, "INPUT" means that the rotational element serves as the input element that receives torque from the engine 6, and "REACTION FORCE" means that the rotational element serves as the reaction-force element to which torque of the first motor 7 is applied, while "OUTPUT" means that the rotational element serves as the output element that delivers torque to the front wheels 2.

The first drive system 4 according to this embodiment of the disclosure may also include a power transmission mechanism 10, as shown in FIG. 2. The power transmission mechanism 10 receives torque from the output element, such as the ring gear R, and increases or reduces the input torque, to deliver the resulting torque to the front wheels 2. The power transmission mechanism 10 may be in the form of a speed reducer having a constant speed ratio, or a transmission capable of changing the speed ratio. In this embodiment of the disclosure, a clutch may be provided on the output side of the engine 6, or a brake mechanism may be provided for stopping rotation of the output shaft of the engine 6 or the input element of the differential mechanism 8, though the clutch or brake mechanism is not particularly shown in the drawings.

Next, the second drive system 5 will be described. In the embodiment shown in FIG. 1, the second drive system 5 has the second motor 11. The second motor 11 may be a motor similar to the above-described first motor 7; thus, a motor-generator (MG) may be employed as the second motor 11. The second motor 11 is coupled to a differential gear unit 12, such that torque of the second motor 11 is transmitted to the right and left rear wheels 3 via the differential gear unit 12.

In the hybrid vehicle 1 shown in FIG. 1, the front wheels 2 are steerable wheels, and a steering device 13 is provided for changing the steering angle of the front wheels 2. The steering device 13 may be similar in construction to a steering device installed on a conventional vehicle.

Each of the above-described motors 7, 11 is electrically connected to a power supply unit 14 that principally consists of a power storage device, such as a battery or a capacitor, and an inverter. Further, an electronic control unit (which will be referred to as "ECU") 15 is provided for controlling each of the motors 7, 11 via the power supply unit 14, and controlling the engine 6. The ECU 15 has a microcomputer as its main component. The ECU 15 is configured to perform computations using data received and data stored in advance, and output results of computations to the power supply unit 14 and the engine 6 as control command signals. Various sensors (not shown) for obtaining data to be received by the ECU 15 are provided. FIG. 4 shows examples of data received by the ECU 15 and control command signals generated from the ECU 15. The received data include, for example, torque of the first motor 7, torque of the second motor 11, steering angle, vehicle speed, yaw rate, lateral acceleration, accelerator pedal stroke, and the state of charge (SOC) of the power storage device. The control command signals generated from the ECU 15 include, for example, a command signal for controlling electric current, or the like, of the first motor 7, command signal for controlling current, or the like, of the second motor 11, fuel control signal for the engine 6, and an ignition signal for controlling ignition in the engine 6. Further, the data stored in advance in the ECU 15 include a reference vehicle speed used for determining the vehicle speed, a reference value used for determining the drive torque sharing ratio of each of the motors 7, 11 or the front and rear wheels 2, 3, criterial values associated with the steering angle, yaw rate, etc. and used for determining a turning condition of the vehicle, and a map used for determining a hybrid mode (which will be referred to as "HV mode") and an electric traveling mode (which will be referred to as "EV mode"). In the HV mode, the vehicle travels by operating the engine 6 and one of the motors 7, 11. In the EV mode, the vehicle travels with output torque of one of the motors 7, 11.

In the hybrid vehicle 1 constructed as described above, when the engine 6 is started by the first motor 7, reaction-force torque against torque delivered by the first motor 7 is applied to the ring gear R, and the drive torque of the front wheels 2 changes due to the reaction-force torque. If the vehicle is turning, the lateral force (cornering force) of the front wheels 2 changes due to change of the drive torque of the front wheels 2. Thus, a control system according to this embodiment of the disclosure is configured to perform control as described below, so as to improve the traveling stability, or curb reduction of the traveling stability, by curbing change of a steering characteristic induced by starting of the engine 6 during turning. The control as described below is performed by the above-described ECU 15.

Figure 5:
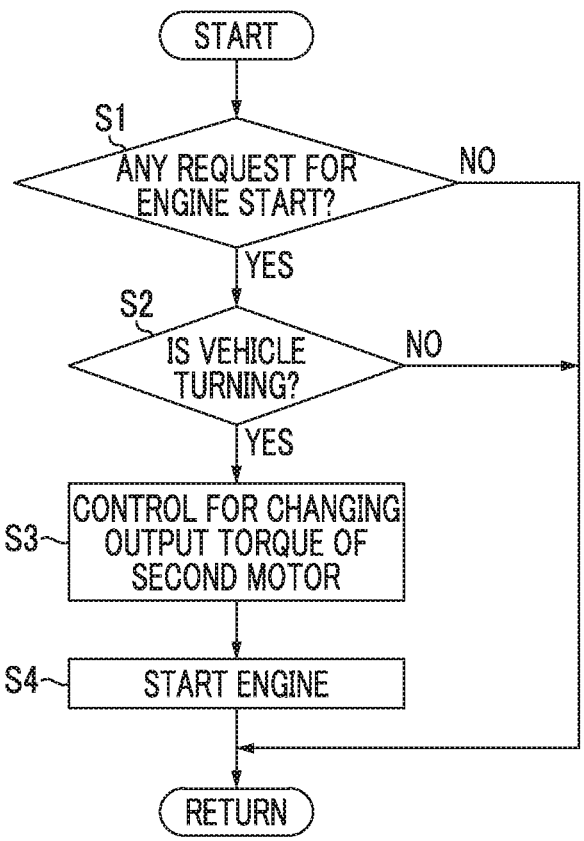
FIG. 5 is a flowchart useful for explaining a first control example carried out in the above embodiment of the disclosure.

A first control example will be described. FIG. 5 is a flowchart useful for explaining one example of control performed by the control system according to this embodiment of the disclosure. The control routine of FIG. 5 is executed by the ECU 15 when the vehicle travels while operation of the engine 6 is stopped, for example, while fuel injection in the engine 6 is stopped. More specifically, the control routine of FIG. 5 is executed by the ECU 15 when the vehicle travels while energy is being regenerated in one of the motors 7, 11, or when the EV mode is established in which the vehicle travels with drive torque produced by the second motor 11, or drive torque produced by the second motor 11 and the first motor 7. Initially, it is determined whether turning of the vehicle and starting of the engine 6 take place at the same time. For example, it is determined (in step S1) whether there is a request for start of the engine, and it is determined (in step S2) whether the vehicle that is traveling is turning. The order of these determinations is not particularly limited, but either of step S1 and step S2 may be executed first.

The request for start of the engine 6 is generated when a condition that the accelerator pedal stroke is increased while the hybrid vehicle 1 is traveling in the EV mode, or a condition that the SOC is reduced, is satisfied. In step S1, it is determined whether a control command signal for starting the engine 6 has been generated as the above condition is satisfied. In the example shown in FIG. 5, if a negative decision (NO) is made in step S1, the ECU 15 returns without performing any particular control. On the other hand, if an affirmative decision (YES) is made in step S1, the ECU 15 proceeds to step S2, and determines whether the vehicle is in the middle of turning during traveling. The determination of step S2 can be made by determining whether any of the steering amount (steering angle) of the steering device 13, steering angle of the front wheels 2, lateral acceleration, yaw rate, etc. is equal to or larger than a given value that is a predetermined criterion or basis of determination.

If a negative decision (NO) is made in step S2, turning of the vehicle and starting of the engine 6 do not take place at the same time, and therefore, the ECU 15 returns without performing any particular control. On the other hand, if an affirmative decision (YES) is made in step S2, the output torque of the second motor 11 is changed (step S3). The control for changing the output torque of the second motor 11 is performed so as to prevent or curb change of the steering characteristic when the first motor 7 motors the engine 6 so as to start the engine 6. The steering characteristic is changed due to reduction of the lateral force induced by increase of an absolute value of the wheel torque, or due to increase of the lateral force induced by reduction of the absolute value of the wheel torque.

In the hybrid vehicle 1 constructed as shown in FIG. 1 and FIG. 2, as the output torque of the first motor 7 is increased in the positive direction, torque is applied in the positive direction to the engine 6 coupled to the carrier C, so as to motor the engine 6. In this case, reaction-force torque induced by motoring of the engine 6 is applied to the front wheels 2 to which torque is transmitted from the ring gear R. Generally, the lateral force of the wheels decreases as the absolute value of the drive torque or braking torque (the drive torque and the braking torque may be collectively and simply referred to as "wheel torque") increases, and, conversely, the lateral force increases as the absolute value of the wheel torque decreases. Accordingly, if the torque of the front wheels 2 is torque that causes the vehicle to travel forward, the drive torque (the absolute value of the wheel torque) of the front wheels 2 is reduced due to application of the reaction-force torque to the wheels 2, and the lateral force increases with reduction of the absolute value of the wheel torque. Also, if the torque of the front wheels 2 is "0", the reaction-force torque provides drive torque of a negative rotational direction (in which the vehicle travels backward), and the absolute value of the wheel torque increases; therefore, the lateral force of the front wheels 2 is reduced. Thus, if the engine 6 is motored by the first motor 7 during turning of the vehicle, the steering characteristic of the hybrid vehicle 1 may change to the oversteer (O/S) side, or change to the understeer (U/S) side, depending on a condition of the torque of the front wheels 2. Namely, the steering characteristic of the hybrid vehicle 1 changes to the oversteer (O/S) side as the lateral force of the front wheels 2 increases, or the steering characteristic of the hybrid vehicle 1 changes to the understeer (U/S) side as the lateral force of the front wheels 2 decreases. In this embodiment of the disclosure, "change of the steering characteristic to the oversteer side" includes reduced likelihood of understeering, and increased likelihood of oversteering. Also, "change of the steering characteristic to the understeer side" includes reduced likelihood of oversteering, and increased likelihood of understeering.

On the other hand, at the rear wheels 3, too, the lateral force of the rear wheels 3 decreases as the wheel torque increases, or the lateral force of the rear wheels 3 increases as the wheel torque decreases. Then, the steering characteristic changes to the oversteer (O/S) side if the lateral force of the rear wheels 3 that are not steerable wheels is reduced, and the steering characteristic changes to the understeer (U/S) side if the lateral force of the rear wheels 3 is increased.

Accordingly, in step S3, if the lateral force of the front wheels 2 changes so as to change the steering characteristic to the understeer side as the engine 6 is motored by the first motor 7, the ECU 15 controls torque of the second motor 11, so that the lateral force of the rear wheels 3 changes so as to change the steering characteristic to the oversteer side. Similarly, if the lateral force of the front wheels 2 changes so as to change the steering characteristic to the oversteer side as the engine 6 is motored by the first motor 7, the ECU 15 controls torque of the second motor 11, so that the lateral force of the rear wheels 3 changes so as to change the steering characteristic to the understeer side.

Figure 6:
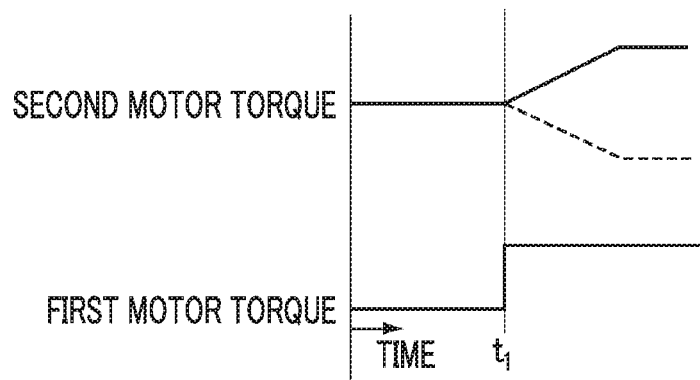
FIG. 6 is a graph useful for explaining change of output torque of a second motor.

The torque of the second motor 11 is controlled by increasing the output torque, or reducing the output torque, according to the operating conditions or traveling conditions of the hybrid vehicle 1, as will be described later. The output torque of the second motor 11 is changed at a predetermined gradient or time rate of change. For example, as schematically shown in FIG. 6, the ECU 15 increases the torque of the first motor 7 to a given value at time t1 so as to motor the engine 6. Then, along with the control of the torque of the first motor 7, the ECU 15 increases or reduces the output torque of the second motor 11 at the predetermined gradient or time rate of change. With the output torque thus controlled, the drive torque of the hybrid vehicle 1 changes gently or slowly, which makes it possible to avoid or suppress shock or a feeling of strangeness. Also, when the output torque of the first motor 7 is increased so as to motor the engine 6, and the output torque of the second motor 11 is changed so as to prevent or curb change of the steering characteristic due to the increase of the output torque of the first motor 7, it is preferable that, after changing the output torque of the first motor 7 and that of the second motor 11, the ECU 15 further controls the first motor 7 and the second motor 11, so that the drive torque of the hybrid vehicle 1 is applied in such a direction as to accelerate the hybrid vehicle 1. In particular, if the request for start of the engine 6 is generated based on increase of the accelerator pedal stroke, the ECU 15 controls the output torque of each of the motors 7, 11, so as to accelerate the hybrid vehicle 1.

The amount of change of the lateral force of the front wheels 2 and that of the rear wheels 3 vary with the amount of change of the wheel torque of the front wheels 2 and that of the rear wheels 3, respectively. The lateral force may also change depending on the vehicle-to-ground contact load (axle load), and the vehicle-to-ground contact load may change depending on the longitudinal acceleration of the vehicle. Accordingly, the control amount of the torque of the second motor 11 in step S3 is obtained in the manner as follows. Initially, the amount of change of the lateral force of the front wheels 2 based on the amount of change of the wheel torque of the front wheels 2 due to motoring of the engine 6 and change of the vehicle-to-ground contact load of the front wheels 2 is obtained, and change of the steering characteristic according to the amount of change of the lateral force is obtained. Then, a target amount of change of the lateral force produced at the rear wheels 3 so as to diminish the obtained steering characteristic is obtained, and the wheel torque of the rear wheels 3, which achieves the target amount of change, is obtained based on changes in the wheel torque of the rear wheels 3 and the vehicle-to-ground contact load, for example. Then, the ECU 15 controls the torque of the second motor 11, so as to provide the wheel torque obtained in this manner in step S3. While the torque of the second motor 11 for curbing change of the steering characteristic may be obtained each time by computation, according to an arithmetic expression prepared in advance, it may also be obtained from a map instead. Namely, a map that defines the torque control amount of the second motor 11 according to the wheel torque of the front wheels 2, its amount of change, vehicle speed, road gradient, and the number of passengers, for example, may be prepared, and the torque control amount of the second motor 11 may be calculated from the map.

After the above-described control of step S3, or in parallel with the control of step S3, the engine is started (step S4), and the ECU 15 returns. The control of step S4 is control for increasing the output torque of the first motor 7 in the positive direction so as to motor the engine 6, and supplying or injecting the fuel into the engine 6 for ignition. After completing start-up of the engine 6, the ECU 15 controls the output torque of the engine 6 and each of the motors 7, 11, according to traveling conditions, such as the amount of drive request like the accelerator pedal stroke and the vehicle speed at the point in time in question.

As described above, the reaction-force torque is applied to the front wheels 2 as the engine 6 is motored by the first motor 7. Even if the reaction-force torque becomes a factor of change of the steering characteristic, the ECU 15 controls the torque of the rear wheels 3 so as to curb the change of the steering characteristic. Thus, according to the control system of this embodiment of the disclosure, when the engine 6 is started while the vehicle is turning, change of the steering characteristic is prevented or curbed, and the traveling stability is improved, or prevented from being impaired. Also, starting of the engine 6 is not disturbed or delayed, which makes it possible to satisfy an acceleration request or a drive request, and prevent or suppress excessive discharge of the power storage device.

Figure 7:
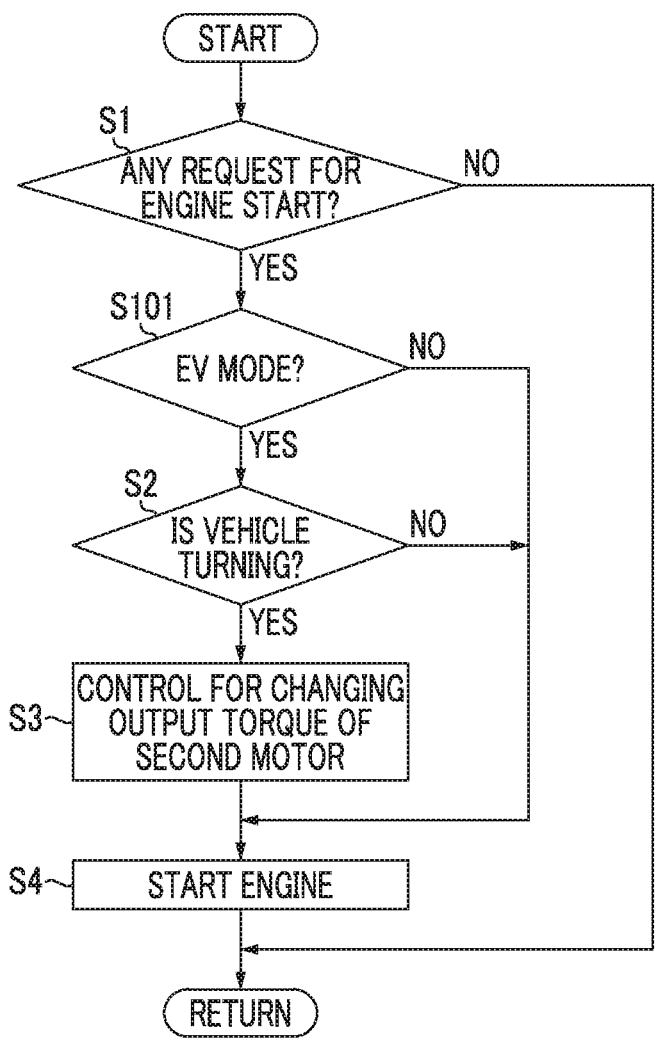
FIG. 7 is a flowchart useful for explaining a second control example carried out in the embodiment of the disclosure.

Next, a second control example will be described. The above-described control of step S3 can be arranged to be performed when the hybrid vehicle 1 travels in the EV mode. The control of step S3 is to prevent or curb change of the steering characteristic due to motoring of the engine 6 by the first motor 7, by changing the torque of the second motor 11. For example, the ECU 15 may be configured to determine whether the EV mode is set, before performing the above-described control of step S3, and perform the control of step S3 when an affirmative decision (YES) is made. One example of this configuration is illustrated in FIG. 7. In the control example shown in FIG. 7, step S101 for determining whether the EV mode is set is provided subsequent to step S1 of the flowchart shown in FIG. 5. If an affirmative decision (YES) is made in step S101, step S2 and subsequent steps are executed. Since the control example shown in FIG. 7 is identical with the control example shown in FIG. 5, except for step S101, the same reference numerals as used in FIG. 5 are assigned to the corresponding steps in FIG. 7, and these steps will not be explained. If a negative decision (NO) is made in step S101, the ECU 15 proceeds to step S4, and immediately performs control for starting the engine 6.

Next, a third control example will be described. The hybrid vehicle 1 to which this disclosure is applied may be arranged such that the rear wheels 3 are driven by the engine 6, and may travel with output torque of the second motor 11, or may travel with output torque of the two motors 7, 11, in the EV mode. Accordingly, the wheel torque of the front wheels 2 and the wheel torque of the rear wheels 3 during turning of the vehicle are in various conditions, depending on the drive type or mode of the hybrid vehicle 1, and operating conditions of the respective motors 7, 11 at that point in time. The control system according to this embodiment of the disclosure is configured to perform control according to the drive type of the hybrid vehicle 1 and the operating conditions of the respective motors 7, 11 at the point in time. In the following, some examples of the control will be described. While the controls that will be described below may be carried out as a series of control routines, they will be explained as individual control routines, for the sake of simplicity of explanation.

Figure 8:
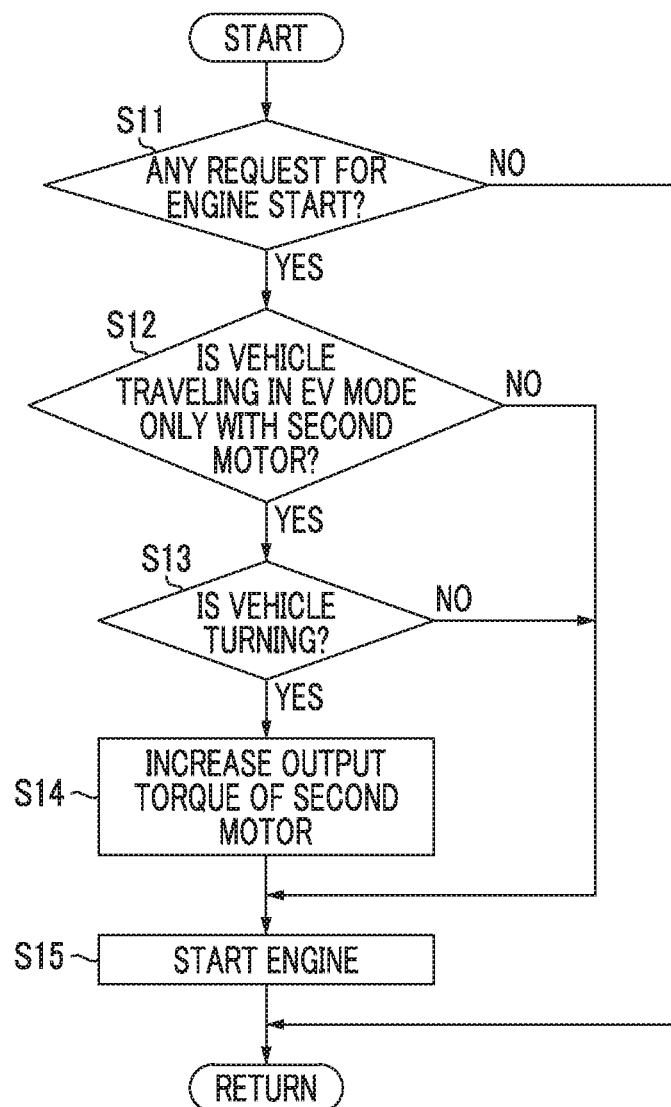
FIG. 8 is a flowchart useful for explaining a third control example carried out in the embodiment of the disclosure.

FIG. 8 is a flowchart useful for explaining a control example in the case where turning of the vehicle while it is traveling in the EV mode only with the drive torque of the second motor 11, and starting of the engine, take place at the same time. Initially, the ECU 15 determines whether there is a request for start of the engine 6 (step S11). This determination can be made in a manner similar to the determination of step S1 shown in FIG. 5 as described above. If a negative decision (NO) is made in step S11, the ECU 15 returns without performing any particular control. On the other hand, if an affirmative decision (YES) is made in step S101, the ECU 15 determines whether the EV mode set at this point in time is a mode (so-called single drive mode) in which the vehicle travels with the output torque of the second motor 11 driving only the rear wheels 3 (step S12). This determination can be made based on output states of control command signals to the respective motors 7, 11.

If an affirmative decision (YES) is made in step S12, the ECU 15 determines whether the vehicle is in the middle of turning (step S13). The determination of step S13 can be made in a manner similar to the determination of step S2 shown in FIG. 5 as described above. If an affirmative decision (YES) is made in step S13, motoring of the engine 6 by the first motor 7 may become a factor of change of the steering characteristic; therefore, the ECU 15 controls torque of the second motor 11 so as to prevent or curb change of the steering characteristic (step S14).

In a condition where the vehicle travels with the rear wheels 3 driven by the second motor 11, the front wheels 2 are not driven by the first motor 7, and therefore, the lateral force of the front wheels 2 during turning is maximized. If the reaction-force torque is applied to the front wheels 2 in this condition, due to motoring of the engine 6 by the first motor 7, the front wheels 2 receive braking torque, and the absolute value of the wheel torque of the front wheels 2 increases, resulting in reduction of the lateral force. Namely, the lateral force of the front wheels 2 changes so as to change the steering characteristic to the understeer side. Thus, in the control of step S14, the ECU 15 controls the torque of the rear wheels 3, so as to diminish the change to the understeer side caused by the front wheels 2. More specifically, the output torque of the second motor 11 is increased so as to increase the drive torque of the rear wheels 3 (the absolute value of the wheel torque). Namely, the output torque of the second motor 11 is increased so that the lateral force of the rear wheels 3 is reduced, and the steering characteristic is changed to the oversteer side. The torque or the control amount may be obtained in a manner similar to that as described above with regard to step S3 of FIG. 5.

Then, the ECU 15 performs control for starting the engine 6 (step S15) and then returns. The control of step S15 is similar to that of step S4 shown in FIG. 5 as described above.

On the other hand, if a negative decision (NO) is made in the above-described step S12, or if a negative decision (NO) is made in step S13, the ECU 15 immediately proceeds to step S15, to perform control for starting the engine 6. This is because the hybrid vehicle 1 is not traveling, or not turning.

Thus, in the control example shown in FIG. 8, the reaction-force torque produced by motoring of the engine 6 by the first motor 7 is applied as braking torque to the front wheels 2. As a result, the lateral force of the front wheels 2 is reduced, and the steering characteristic changes to the understeer side. In this case, the drive torque of the rear wheels 3 is increased, and its lateral force is reduced, so that the steering characteristic is changed to the oversteer side, due to the increase of the drive torque of the rear wheels 3. Consequently, the change of the steering characteristic to the understeer side induced by starting of the engine 6 is cancelled or diminished by the change of the steering characteristic to the oversteer side caused by increasing the drive torque of the rear wheels 3. Therefore, the steering characteristic of the hybrid vehicle 1 as a whole can be prevented from changing, or made less likely to change.

Next, a fourth control example will be described. Namely, a control example in which the vehicle runs in the EV mode using the motors 7, 11 will be described. FIG. 9 is a flowchart useful for explaining one example of the control. Initially, the ECU 15 determines whether there is a request for start of the engine 6 (step S21). This determination can be made in a manner similar to the determination of step S1 shown in FIG. 5 as described above. If a negative decision (NO) is made in step S21, the ECU 15 returns without performing any particular control. On the other hand, if an affirmative decision (YES) is made in step S21, the ECU 15 determines whether the EV mode at the time when the ECU 15 determines that there is a request for start of the engine 6 is a mode (so-called both-motor-drive mode) in which the vehicle travels by driving the motors 7, 11 (step S22). This determination can be made based on the output state of a control command signal to each of the motors 7, 11.

If an affirmative decision (YES) is made in step S22, the ECU 15 determines whether the vehicle is in the middle of turning during traveling (step S23). The determination in step S23 can be made in a manner similar to the determination of step S2 shown in FIG. 5 as described above. If an affirmative decision (YES) is made in step S23, the ECU 15 determines whether the drive torque sharing ratio $\Delta T_{df}$ of the front wheels 2 is equal to or larger than a predetermined reference value $\alpha$ (step S24). In the so-called both-motor-drive mode, it is preferable that each of the motors 7, 11 operates with the highest possible efficiency. To this end, the torque delivered by each of the motors 7, 11, namely, the ratio of the output torque of each motor 7, 11 to the overall drive torque, varies depending on the vehicle speed, accelerating condition, and so forth. The drive torque sharing ratio $\Delta T_{df}$ of the front wheels 2 determined in step S24 is the ratio of the drive torque delivered at the front wheels 2 (or the drive torque imparted to the front wheels 2) to the overall drive torque of the hybrid vehicle 1. The overall drive torque of the hybrid vehicle 1 can be obtained based on the accelerator pedal stroke, or can be obtained from the control command signals transmitted to the respective motors 7, 11. Also, the drive torque of the front wheels 2 can be obtained from the control command signal to the first motor 7. Further, the reference value $\alpha$ is a value based on which it is determined whether the steering characteristic of the hybrid vehicle 1 is on the oversteer side, or on the understeer side. The reference value $\alpha$ can be obtained by experiment using the actual vehicle, or through simulations, for example. The reference value $\alpha$ may be a constant, or may be a variable that is changed according to the vehicle speed, the weight of the load, the number of passengers, the road gradient, and so forth.

When the drive torque sharing ratio $\Delta T_{df}$ of the front wheels 2 is equal to or larger than the reference value $\alpha$, and an affirmative decision (YES) is made in step S24, the drive torque (the absolute value of the wheel torque) of the front wheels 2 during turning of the vehicle is large, and therefore, the lateral force of the front wheels 2 is small. Accordingly, the steering characteristic of the hybrid vehicle 1 is on the understeer side. If the engine 6 is motored by the first motor 7 in this condition, the drive torque (the absolute value of the wheel torque) of the front wheels 2 is reduced, and the lateral force of the front wheels 2 is increased. As a result, the steering characteristic is apt to change for the reduced likelihood of understeering, or change to the oversteer side. The ECU 15 controls the torque of the second motor 11 (step S25), so as to prevent or curb such change of the steering characteristic. This control is to change the drive torque (the absolute value of the wheel torque) of the rear wheels 3, or the lateral force, so as to change the steering characteristic to the understeer side. Therefore, the output torque of the second motor 11 is reduced so as to increase the lateral force of the rear wheels 3. The torque or the control amount may be obtained in a manner similar to that explained above with respect to step S3 of FIG. 5. Also, it is preferable to control the manner of changing the output torque of the second motor 11 so that the sum of the output torques of the respective motors 7, 11 after the change provides torque applied in the accelerating direction, for the same reason as described above with respect to step S3 of FIG. 5 as described above.

Then, the ECU 15 performs control for starting the engine 6 (step S26), and then returns. The control of step S26 is similar to that of step S4 shown in FIG. 5 as described above.

On the other hand, if a negative decision (NO) is made in the above-indicated step S22, namely, if the vehicle is not in the both-motor-drive mode, there is no need to perform control based on the drive torque sharing ratio $\Delta T_{df}$ of the front wheels 2. Accordingly, in this case, the ECU 15 immediately proceeds to step S26, and executes control for starting the engine 6. Also, if a negative decision (NO) is made in the above-indicated step S23, namely, if the hybrid vehicle 1 is not in the middle of turning, the ECU 15 immediately proceeds to step S26, and executes control for starting the engine 6. Further, if a negative decision (NO) is made in the above-indicated step S24, the ECU 15 immediately proceeds to step S26, and executes control for starting the engine 6.

Thus, in the control example shown in FIG. 9, too, the steering characteristic changes due to change of the wheel torque of the front wheels 2, in a direction opposite to that in which the steering characteristic changes due to change of the wheel torque of the rear wheels 3. Therefore, even if the engine 6 starts while the vehicle is turning, the steering characteristic is less likely or unlikely to change, and the traveling stability of the hybrid vehicle 1 can be improved. Also, since starting of the engine 6 is not restricted, a request for acceleration or drive request can be satisfied. Further, the engine 6 is driven so that power can be generated by the first motor 7; therefore, the power storage device is prevented from being excessively discharged, or is less likely to be excessively discharged.

Next, a fifth control example will be described. In contrast to the control example shown in FIG. 9, the control example shown in FIG. 10 is directed to the case where the drive torque sharing ratio $\Delta T_{df}$ of the front wheels 2 is small. A predetermined value based on which it is determined whether the drive torque sharing ratio $\Delta T_{df}$ of the front wheels 2 is large or small in the control example shown in FIG. 10 may be different from the above-mentioned reference value $\alpha$. However, the reference value $\alpha$ may be employed. In the example described below, it is determined based on the reference value $\alpha$ whether the drive torque sharing ratio $\Delta T_{df}$ of the front wheels 2 is large or small.

In the control example shown in FIG. 10, the ECU 15 determines whether there is a request for start of the engine 6 (step S31), whether the vehicle is in the so-called both-motor-drive mode (step S32), and whether the vehicle is in the middle of turning (step S33), as in the control example shown in FIG. 9 as described above. These determination steps may be the same as the determination steps of step S21 through step S23 shown in FIG. 9.

If an affirmative decision (YES) is made in step S33, the ECU 15 determines whether the drive torque sharing ratio $\Delta T_{df}$ of the front wheels 2 is smaller than the above-indicated reference value $\alpha$ (step S34). When the drive torque sharing ratio $\Delta T_{df}$ of the front wheels 2 is smaller than the reference value $\alpha$, and an affirmative decision (YES) is made in step S34, the drive torque (the absolute value of the wheel torque) of the front wheels 2 during turning of the vehicle is small, and therefore, the lateral force of the front wheels 2 is large. Accordingly, the steering characteristic of the hybrid vehicle 1 is on the oversteer side. If the engine 6 is motored by the first motor 7 in this condition, reaction-force torque induced by motoring is applied to the front wheels 2. In the condition where the drive torque (the absolute value of the wheel torque) imparted to the front wheels 2 is originally small, if the reaction-force torque exceeds the drive torque imparted to the front wheels 2, the reaction-force torque turns into braking torque of the front wheels 2, and the absolute value of the wheel torque increases. As a result, the lateral force of the front wheels 2 may be reduced. In this case, the steering characteristic changes due to motoring, to the understeer side. Thus, if an affirmative decision (YES) is made in step S34, the ECU 15 increases the output torque of the second motor 11 (step S35), so as to increase the absolute value of the wheel torque of the rear wheels 3, and reduce the lateral force of the rear wheels 3, so that the steering characteristic changes to the oversteer side. In this connection, the torque or the control amount may be obtained in a manner similar to that explained above with respect to step S3 of FIG. 5. Also, it is preferable to control the manner of changing the output torque of the second motor 11 so that the sum of the output torques of the respective motors 7, 11 after the change provides torque applied in the accelerating direction, for the same reason as described above with respect to step S3 of FIG. 5.

Then, the ECU 15 performs control for starting the engine 6 (step S36), and then returns. The control of step S36 is similar to that of step S4 shown in FIG. 5 as described above. As in the control example shown in FIG. 9 as described above, the ECU 15 returns without performing any particular control if a negative decision (NO) is made in step S31, and the ECU 15 immediately proceeds to step S36 and executes control for starting the engine 6 when a negative decision (NO) is made in step S32, step S33 and step S34.

Thus, in the control example shown in FIG. 10, too, the steering characteristic changes due to change of the wheel torque of the front wheels 2, in a direction opposite to that in which the steering characteristic changes due to change of the wheel torque of the rear wheels 3. Therefore, even if the engine 6 starts while the vehicle is turning, the steering characteristic is less likely or unlikely to change, and the traveling stability of the hybrid vehicle 1 can be improved. Also, since starting of the engine 6 is not restricted, the request for acceleration or drive request can be satisfied. Further, the engine 6 is driven so that power can be generated by the first motor 7; therefore, the power storage device is prevented from being excessively discharged, or is less likely to be excessively discharged.

The ratio of the drive torque imparted to the front wheels 2 and the ratio of the drive torque imparted to the rear wheels 3 have a relationship that, as one of the ratios increases, the other ratio decreases. Thus, in the control example shown in FIG. 9 and the control example shown in FIG. 10, the drive torque sharing ratio of the rear wheels 3 may be compared with the reference value α, or a predetermined value that replaces the reference value α, instead of comparing the drive torque sharing ratio $\Delta T_{df}$ of the front wheels 2 with the reference value α. Then, the torque of the second motor 11 may be controlled based on the result of comparison.

Next, a sixth control example will be described. As described above, if the wheel torque of the front wheels 2 is reduced, the lateral force increases, and the steering characteristic changes to the oversteer side. Also, if the wheel torque of the rear wheels 3 is reduced, the lateral force increases, and the steering characteristic changes to the understeer side. Accordingly, the content of control may be different between the case where the wheel torque of the front wheels 2 is reduced due to motoring of the engine 6, and the case where the wheel torque of the rear wheels 3 is reduced due to motoring of the engine 6. In the above-described second through fifth control examples, the wheel torque of the front wheels 2 is reduced due to motoring of the engine 6. Unlike these examples, control as described below is performed when the engine 6 and the first motor 7 are coupled to the rear wheels 3, and the second motor 11 is coupled to the front wheels 2.

In the control example shown in FIG. 8 as described above, the engine 6 is started from a condition where the rear wheels 3 are driven by the second motor 11, and no torque is delivered from the first motor 7 to the front wheels 2. In the case where the front wheels 2 and the rear wheels 3 are switched with each other in this control example, the engine 6 is motored by the first motor 7, during traveling in the EV mode in which the front wheels 2 are driven by the second motor 11, so that the wheel torque (torque in the braking direction) of the rear wheels 3 is generated. As a result, the wheel torque of the rear wheels 3 increases, and the lateral force of the rear wheels 3 is reduced. Accordingly, in this case, the steering characteristic changes to the oversteer side due to motoring of the engine 6. Since the lateral force of the front wheels 2 needs to be reduced so as to curb the change of the steering characteristic, the ECU 15 increases the output torque of the second motor 11 coupled to the front wheels 2. Namely, control similar to the control of the torque of the second motor 11 in step S14 shown in FIG. 8 is performed.

Next, a seventh control example will be described. In the case where the front wheels 2 and the rear wheels 3 are switched with each other, and the front wheels 2 are driven by the second motor 11, while the first motor 7 and the engine 6 are coupled to the rear wheels 3, in the control example shown in FIG. 9 as described above, the drive torque of the rear wheels 3 is reduced, and the lateral force of the rear wheels 3 is increased, due to motoring of the engine 6. In this case, the drive torque sharing ratio of the rear wheels 3 is small, and the lateral force of the rear wheels 3 is large. Accordingly, the steering characteristic is on the understeer side. If the engine 6 is motored in this condition, and reaction-force torque is applied to the rear wheels 3, the reaction-force torque may become larger than the torque before starting control of the engine 6, and may be applied in the braking direction. In this case, the lateral force of the rear wheels 3 is reduced, thus causing the steering characteristic to change to the oversteer side. Since the lateral force of the front wheels 2 having the larger drive torque sharing ratio needs to be reduced, so as to curb the change of the steering characteristic, the ECU 15 increases the output torque of the second motor 11 to which the front wheels 2 are coupled. Namely, control that is opposite in the direction of change of torque, to the control of the torque of the second motor 11 in step S25 shown in FIG. 9, is performed.

Next, an eighth control example will be described. In the case where the front wheels 2 and the rear wheels 3 are switched with each other, and the front wheels 2 are driven by the second motor 11, while the first motor 7 and the engine 6 are coupled to the rear wheels 3, in the control example of FIG. 10, the drive torque of the rear wheels 3 is reduced, and the lateral force of the rear wheels 3 is increased, due to motoring of the engine 6. In this case, the drive torque sharing ratio of the rear wheels 3 is large, and the lateral force of the rear wheels 3 is small. Accordingly, the steering characteristic is on the oversteer side. In this condition, if reaction-force torque is applied to the rear wheels 3 due to motoring of the engine 6, the drive torque of the rear wheels 3 is reduced, and the lateral force of the rear wheels 3 increases, so that the steering characteristic changes to the understeer side. Since the lateral force of the front wheels 2 having the smaller drive torque sharing ratio needs to be increased, so as to curb the change of the steering characteristic, the ECU 15 reduces the output torque of the second motor 11 to which the front wheels 2 are coupled. Namely, control that is opposite in the direction of change of torque, to the control of the torque of the second motor 11 in step S35 shown in FIG. 10, is performed.

Other control examples will be described. The control system according to this embodiment of the disclosure is configured to control the lateral force during turning of the vehicle through control of the output torque of the motor 7, 11. The determination or detection of turning may be conducted by use of various sensors as described above. Instead, turning of the vehicle may be predicted, and the output torque of the motor 7, 11 may be controlled as described above based on the result of the prediction. The prediction of turning may be performed using map data of a navigation system, and position data of the own vehicle obtained by a GPS system. The prediction of turning may also be performed using data of a traveling schedule of several seconds ahead, which is obtained by a self-driving system. Also, the prediction of turning may include prediction of the turning direction, turning radius, vehicle speed, turning distance, gradient of the road surface on which the vehicle turns, etc. On the basis of these items of data, turning may be determined in advance, and the driving force during turning may be controlled. If so-called prediction control as described above is performed, it is possible to prevent or curb change of the steering characteristic with higher reliability, and improve the traveling stability, when the engine 6 is started during turning.

While some embodiments or examples of the disclosure have been described above, this disclosure is not limited to the above-described embodiments, but may be changed as appropriate provided that the object of the disclosure is achieved. For example, as the electronic control unit according to this disclosure, an electronic control unit that controls the engine, and an electronic control unit provided for each motor for controlling the motor, may be provided, or another electronic control unit that integrates these electronic control units and controls the engine and the motors may be provided. The differential mechanism according to this disclosure is only required to be arranged to perform differential operation with at least three rotational elements; therefore, it may be a mechanism other than the planetary gear mechanism.

What is claimed is:
1. A control system for a hybrid vehicle, the hybrid vehicle including an engine and a first motor each configured to deliver drive torque to first drive wheels as one pair of front wheels and rear wheels, a second motor configured to deliver drive torque to second drive wheels as the other pair of the front wheels and the rear wheels, and a differential mechanism including a first rotational element configured to receive torque of the engine, a second rotational element configured to receive torque of the first motor, and a third rotational element configured to deliver torque to the first drive wheels, the control system comprising an electronic control unit configured to:

perform motoring of the engine by the first motor; and control output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor, wherein the first drive wheels are the front wheels, and the second drive wheels are the rear wheels, and the electronic control unit is configured to determine whether a drive torque sharing ratio of the front wheels is equal to or larger than a predetermined reference value; and reduce the output torque of the second motor, when the drive torque sharing ratio of the front wheels is equal to or larger than the reference value, and motoring of the engine by the first motor is performed; and the drive torque sharing ratio of the front wheels is a ratio of drive torque of the front wheels to overall drive torque of the hybrid vehicle when the hybrid vehicle turns while traveling with the output torque of the first motor and the output torque of the second motor.

2. The control system according to claim 1, wherein the electronic control unit is configured to increase the output torque of the second motor when motoring of the engine by the first motor is performed and the hybrid vehicle turns while traveling with the output torque of the second motor.

3. The control system according to claim 1, wherein the electronic control unit is configured to increase the output torque of the second motor when motoring of the engine by the first motor is performed, in one of a condition where the hybrid vehicle turns while traveling with output torque of the second motor, and a condition where the hybrid vehicle turns while traveling with the output torque of the first motor and the output torque of the second motor.

4. The control system according to claim 1, wherein the electronic control unit is configured to change the output torque of the second motor at a predetermined rate of change.

5. The control system according to claim 1, wherein the electronic control unit is configured to further control output torque of the first motor and the output torque of the second motor, such that total torque as a sum of torque at the first drive wheels and torque at the second drive wheels after the output torque of the second motor is controlled in the direction to curb change of the steering characteristic is applied in such a direction as to accelerate the hybrid vehicle.

6. A control system for a hybrid vehicle, the hybrid vehicle including an engine and a first motor each configured to deliver drive torque to first drive wheels as one pair of front wheels and rear wheels, a second motor configured to deliver drive torque to second drive wheels as the other pair of the front wheels and the rear wheels, and a differential mechanism including a first rotational element configured to receive torque of the engine, a second rotational element configured to receive torque of the first motor, and a third rotational element configured to deliver torque to the first drive wheels, the control system comprising an electronic control unit configured to:

perform motoring of the engine by the first motor; and control output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor, wherein the first drive wheels are the front wheels, and the second drive wheels are the rear wheels, and the electronic control unit is configured to:

determine whether a drive torque sharing ratio of the front wheels is smaller than a predetermined reference value; and increase the output torque of the second motor, when the drive torque sharing ratio of the front wheels is smaller than the reference value, and motoring of the engine by the first motor is performed;

the drive torque sharing ratio of the front wheels is a ratio of drive torque of the front wheels to overall drive torque of the hybrid vehicle when the hybrid vehicle turns while traveling with the output torque of the first motor and the output torque of the second motor.

7. A hybrid vehicle comprising:

an engine and a first motor each configured to deliver drive torque to first drive wheels as one pair of front wheels and rear wheels;

a second motor configured to deliver drive torque to second drive wheels as the other pair of the front wheels and the rear wheels; and a differential mechanism including a first rotational element configured to receive torque of the engine, a second rotational element configured to receive torque of the first motor, and a third rotational element configured to deliver torque to the first drive wheels; and an electronic control unit configured to perform motoring of the engine by the first motor, and control output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor, wherein the first drive wheels are the front wheels, and the second drive wheels are the rear wheels, and the electronic control unit is configured to:

determine whether a drive torque sharing ratio of the front wheels is equal to or larger than a predetermined reference value; and reduce the output torque of the second motor, when the drive torque sharing ratio of the front wheels is equal to or larger than the reference value, and motoring of the engine by the first motor is performed, and the drive torque sharing ratio of the front wheels is a ratio of drive torque of the front wheels to overall drive torque of the hybrid vehicle when the hybrid vehicle turns while traveling with the output torque of the first motor and the output torque of the second motor.

8. The hybrid vehicle according to claim 7, wherein the electronic control unit is configured to increase the output torque of the second motor when motoring of the engine by the first motor is performed and the hybrid vehicle turns while traveling with the output torque of the second motor.

9. The hybrid vehicle according to claim 7, wherein the electronic control unit is configured to increase the output torque of the second motor when motoring of the engine by the first motor is performed, in one of a condition where the hybrid vehicle turns while traveling with output torque of the second motor, and a condition where the hybrid vehicle turns while traveling with the output torque of the first motor and the output torque of the second motor.

10. The hybrid vehicle according to claim 7, wherein the electronic control unit is configured to change the output torque of the second motor at a predetermined rate of change.

11. The hybrid vehicle according to claim 7, wherein the electronic control unit is configured to further control output torque of the first motor and the output torque of the second motor, such that total torque as a sum of torque at the first drive wheels and torque at the second drive wheels after the output torque of the second motor is controlled in the direction to curb change of the steering characteristic is applied in such a direction as to accelerate the hybrid vehicle.

12. A hybrid vehicle comprising:
an engine and a first motor each configured to deliver drive torque to first drive wheels as one pair of front wheels and rear wheels;
a second motor configured to deliver drive torque to second drive wheels as the other pair of the front wheels and the rear wheels; and
a differential mechanism including
a first rotational element configured to receive torque of the engine,
a second rotational element configured to receive torque of the first motor, and
a third rotational element configured to deliver torque to the first drive wheels; and
an electronic control unit configured to
perform motoring of the engine by the first motor, and
control output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor, wherein
the first drive wheels are the front wheels, and the second drive wheels are the rear wheels, and
the electronic control unit is configured to:

determine whether a drive torque sharing ratio of the front wheels is smaller than a predetermined reference value; and increase the output torque of the second motor, when the drive torque sharing ratio of the front wheels is smaller than the reference value, and motoring of the engine by the first motor is performed, the drive torque sharing ratio of the front wheels is a ratio of drive torque of the front wheels to overall drive torque of the hybrid vehicle when the hybrid vehicle turns while traveling with the output torque of the first motor and the output torque of the second motor.

13. A control method for a hybrid vehicle, the hybrid vehicle including
an engine and a first motor configured to deliver drive torque to first drive wheels which are front wheels,
a second motor configured to deliver drive torque to second drive wheels which are rear wheels,
a differential mechanism including
a first rotational element configured to receive torque of the engine,
a second rotational element configured to receive torque of the first motor,
a third rotational element configured to deliver torque to the first drive wheels, and
an electronic control unit configured to perform motoring of the engine by the first motor,
the control method comprising:
controlling, by the electronic control unit, output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor
determining whether a drive torque sharing ratio of the front wheels is equal to or larger than a predetermined reference value; and
reducing the output torque of the second motor, when the drive torque sharing ratio of the front wheels is equal to or larger than the reference value, and motoring of the engine by the first motor is performed,
wherein the drive torque sharing ratio of the front wheels is a ratio of drive torque of the front wheels to overall drive torque of the hybrid vehicle when the hybrid vehicle turns while traveling with the output torque of the first motor and the output torque of the second motor.

14. A control method for a hybrid vehicle, the hybrid vehicle including
an engine and a first motor configured to deliver drive torque to first drive wheels which are front wheels,
a second motor configured to deliver drive torque to second drive wheels which are rear wheels,
a differential mechanism including
a first rotational element configured to receive torque of the engine,
a second rotational element configured to receive torque of the first motor,
a third rotational element configured to deliver torque to the first drive wheels, and
an electronic control unit configured to perform motoring of the engine by the first motor,
the control method comprising:

controlling, by the electronic control unit, output torque of the second motor when motoring of the engine by the first motor is performed while the hybrid vehicle is turning with the engine stopped, in such a direction as to curb change of a steering characteristic of the hybrid vehicle due to change of drive torque of the first drive wheels induced by motoring of the engine by the first motor;

determining whether a drive torque sharing ratio of the front wheels is smaller than a predetermined reference value; and increasing the output torque of the second motor, when the drive torque sharing ratio of the front wheels is smaller than the reference value, and motoring of the engine by the first motor is performed, wherein the drive torque sharing ratio of the front wheels is a ratio of drive torque of the front wheels to overall drive torque of the hybrid vehicle when the hybrid vehicle turns while traveling with the output torque of the first motor and the output torque of the second motor.

* * * * *